United States Patent Office 3,203,974
Patented Aug. 31, 1965

3,203,974
PURIFICATION OF ACETONITRILE AND
PROPIONITRILE
Seymour Sobel, Cedar Grove, Vincent J. Iappelli, Lodi, N.J., and Marcia K. Snavely, Mayfield Heights, Ohio, assignors of one-half each to Universal Oil Products Company, Des Plaines, Ill., a corporation of Delaware, and the Standard Oil Company (Ohio), Cleveland, Ohio, a corporation of Ohio
No Drawing. Filed Sept. 5, 1962, Ser. No. 221,442
5 Claims. (Cl. 260—465.1)

This invention relates to a novel process for the purification of contaminated organic compounds and particularly to a process for the removal of basic compounds therefrom. More particularly the invention is concerned with a process for removing contaminants from organic nitrogen-containing, water-soluble compounds.

In many chemical processes the requirement of pure products which are free from any possible contaminants is an economic necessity. The presence of contaminants may lead to final impure products which will thereafter require further purification by means of relatively expensive equipment or, the presence of contaminants may impede the desired reaction thus resulting in loss of final product which may, in some instances, render the process economically unfeasible to operate. Therefore, it is necessary in many chemical processes to remove contaminating influences from starting materials so that the purified product may then be utilized in other chemical processes in an economically attractive manner of operation. For instance, certain organic nitrogen-containing, water-soluble compounds such as acetonitrile, which find a wide variety of use in the chemical industry, including use as an intermediate in the organic synthesis of vitamins such as vitamin B, pharmaceuticals, perfumes, extracts, as a denaturant, a crystallization medium and as a specialized solvent for certain types of polymers, may be contaminated by the presence of certain impurities such nitrogen-containing compounds including cyanide, the pyiridine bases, ammonia, etc. Therefore, in order to utilize a compound such as acetonitrile as a solvent for certain types of polymers where by the polymeric product is not affected, it is necessary to purify said acetonitrile in such a manner so that the contaminants contained therein are removed to such a degree as to no longer affect the utilization of such acetonitrile in any manner whatsoever.

The present process is particularly directed to the removal of basic compounds and specifically to nitrogen-containing basic compounds such as ammonia, the pyridine bases, etc., from organic nitrogen-containing, water-soluble compounds such as acetonitrile (methyl cyanide), propionitrile (ethyl cyanide), etc. The term "pyridine bases" as used in the present specification and appended claims will be understood to include pyridine, pyridine derivatives and pyridine bases. Certain methods of removing nitrogen-containing basic compounds from hydrocarbons or other organic compounds have been known in the prior art, for example, one such method being the use of strong mineral acids such as, for example, concentrated sulfuric acid, hydrochloric acid, etc., whereby the nitrogen bases form sulfates, chlorides, etc., with the acids. However, the use of such strong acids may cause deterioration of the nitrogen-containing, water-soluble compounds by way of hydrolysis, polymerization and/or decomposition, said deterioration then resulting in the formation of other impurities with a correspondingly lower yield of the desired product. This formation of other impurities then requires further purification to remove the aforesaid new impurities. Other forms of purification as shown in the prior art utilize organic carboxylic acids to remove impurities. However, when acids are utilized for the removal of basc compounds, it is from hydrocarbon fractions and more specifically water-insoluble hydrocarbon fractions rather than from water-soluble compounds which contain other elements besides carbon and hydrogen atoms.

In contradistinction to these prior art methods we have now discovered that basic compounds and particularly nitrogen containing basic compounds may be removed from water-soluble organic compounds by the utilization of certain decontaminating compounds, the use of which does not result in the formation of other impurities.

It is, therefore, an object of this invention to provide a process for the removal of contaminants from certain organic substances whereby the latter may be recovered in a relatively purified condition.

Another object of this invention is to provide a process for the removal of contaminants from certain organic compounds which are nitrogen containing and are water-soluble in nature by treatment with a relatively weak inorganic acid or anhydride thereof of the type hereinafter set forth in greater detail, to provide relatively pure organic compounds.

Taken in its broadest aspect one embodiment of this invention resides in a process for the removal of contaminants from an organic nitrogen-containing, water-soluble compounds which comprises treating said organic compound at an elevated temperature with a compound selected from the group consisting of the acids and acid anhydrides formed by the combination of oxygen and a normally solid element of Groups III, IV and V of the Periodic Table, and recovering the purified organic nitrogen-containing compound.

Another embodiement of this invention resides in a process for the removal of contaminants from an organic nitrogen-containing, water-soluble compound which comprises treating said compound at a temperature in the range of from about 50° to about 150° C., with a compound selected from the group consisting of the acids and acid anhydrides formed by the combination of oxygen and a normally solid element of Groups III, IV and V of the Periodic Table, and recovering in purified organic compound.

A further embodiment of this invention resides in a process for the removal of contaminants from an organic nitrogen-containing, water-soluble compound which comprises treating said organic compound at a temperature in the range of from about 50° to about 150° C. with boric anhydride, and recovering the purified organic nitrogen-containing compound.

A specific embodiment of this invention resides in a process for the removal of pyridine bases from acetonitrile which comprises treating said acetonitrile at a temperature in the range of from about 50° to about 150° C. with boric anhydride, and recovering the purified acetonitrile.

Other objects and embodiments will be found in the following further detailed description of this invention.

As hereinbefore set forth, it has now been discovered that certain contaminants or impurities may be removed from water-soluble, nitrogen-containing organic compounds whereby the purified product may be obtained in specification grade purity. This is especially true when the contaminants or impurities comprise nitrogen-containing basic compounds, the most common of which being pyridine bases. As hereinbefore set forth, these pyridine bases may be present as a side product formed during the process in which the alkyl cyanides such as acetonitrile, propionitrile, etc., are prepared. The impurities are removed by treating the water-soluble, nitrogen-containing organic compound with a compound selected from the group consisting of the acids and acid anhydrides formed by the combination of oxygen and a normally solid element of Groups III, IV and V of the Periodic Table. The treating is usually effected at an elevated temperature in the range of from about 50° to about 150° C., the preferred range being from about 50° to about 75° C. If temperatures exceeding the boiling points of the nitrogen-containing, water-soluble compounds are used, pressures greater than atmospheric (i.e., from about 2 to about 50 atmospheres) may be required, the amount of pressure used being that which is necessary to maintain a major portion of the nitrogen-containing compound in the liquid phase.

The decontaminating compounds which are utilized to remove the aforementioned impurities comprise acids and acid anhydrides which are formed by the combination of oxygen and a normally solid element of Groups III, IV and V of the Periodic Table, said acids and acid anhydrides having an acid dissociation constant of at least $10^{-10}$. Examples of these compounds include boric acid, boric anhydride, phosphoric acid, phosphorous trioxide, phosphorous tetraoxide, phosphorous pentoxide, arsenious acid, stannnic acid, etc. The preferred compounds which fall within the hereinbefore set forth classification which may be utilized in the process of this invention comprise boric acid, and boric oxide (boric anhydride) due to the ready availability and relatively low cost of these compounds as compared to other compounds which also may be used, although not necessarily with equivalent results. In the preferred embodiment of this invention boric anhydride is utilized as the treating agent inasmuch as there is less risk of increasing the water content of the alkyl cyanide when using this compound.

Another contaminant which may be present in compounds of the present type, that is, water-soluble, nitrogen-containing organic compounds, is water. In order to prepare specification grade compounds this water must not be present in an amount in excess of about 15% by weight of the alkyl cyanide, and preferably not more than about 5% by weight of the alkyl cyanide, the excess water being removed prior to removal of the basic nitrogen-containing compounds.

The process of this invention may be effected in any suitable manner and may comprise either a batch or continuous type operation. For example, when a batch type operation is used, a quantity of the organic compound which is to be purified, which does not contain more than about 15% and preferably not more than about 5% by weight of water, is placed in an appropriate apparatus and treated with a decontainating agent such as a boron-containing compound by adding said boron-containing compound to the compound in an amount in a range of from about 2.0 to about 5% by weight. The mixture is continuously stirred and heated to the desired reaction temperature, that is, a temperature in the range of from about 50° to about 150° C., the mixture being maintained at the aforesaid temperature for a predetermined period of time. Following this the purified nitrogen-containing, water-soluble compound is separated from the impurities and recovered.

It is also contemplated within the scope of this invention that the process herein may be also effected in a continuous type of operation, although not ncessarily with equivalent results. For example, when a continuous type method of operation is used, the organic compound containing not more than about 15% by weight of water which is to be purified is continually charged to a reaction zone which is maintained at the proper operating conditions of temperature and pressure that is, atmospheric pressure and an elevated temperature in the range of from about 50° to about 150° C., preferably in a range of from about 50° to about 75° C. The basic compounds containing nitrogen such as ammonia, pyridine, pyridine bases, etc. are removed therein by treating said water-soluble organic compound with a decontaminating agent such as a boron-containing compound which is present in the reaction zone in an amount in the range of from about 2.0 to about 5% by weight of the water-soluble organic compound. Upon completion of the desired residence time, the purified water-soluble, nitrogen-containing organic compound such as an alkyl cyanide is continuously withdrawn, and recovered by conventional means.

The following examples are given to illustrate the process of the present invention which, however, are not intended to limit the generally broad scope of the present invention in strict accordance therewith.

*Example I*

In this experiment 500 grams of acetonitrile containing 320 p.p.m. of basic compounds, said amount of basic compounds being calculated as ammonia, and 0.15% of water, was refluxed at a temperature of about 82° C. for a period of 2 hours along with 10 grams of boric acid. Following the completion of the desired reaction time the purified acetonitrile was separated from the impurities by being flashed away from the solids. The distillate was subjected to analysis and found to contain only 4.5 p.p.m. (calculated as ammonia) of basic compounds.

*Example II*

In this example 500 grams of acetonitrile containing 320 p.p.m. of basic compounds calculated as ammonia and 0.15% of water was treated with 2.5 grams of boric anhydride. The mixture was refluxed at a temperature of about 82° C. for a period of 0.5 hour following which an additional 2.5 grams of boric anhydride was added. Following an additional 0.5 hour of reflux two more additions of 2.5 grams each of boric anhydride were made accompanied by 0.5 hour of reflux for each addition. The total of 10 grams of boric anhydride comprised 2% by weight based on the acetonitrile, the total reflux time being 2 hours. Upon completion of the residence time of the reaction the distillate which was obtained by flashing away the acetonitrile from the solids and impurities was found, after analysis, to contain 13.6 p.p.m. of basic compounds calculated as ammonia.

*Example III*

To illustrate the efficacy of the process of the present invention another experiment was used utilizing relatively large amounts of impure acetonitrile, and the removal agent. For example, in this experiment, 12,500 gallons of crude acetonitrile containing approximately 20% of water was dehydrated. The remaining 10,000 gallons contained 1.5–2% of water and from 0.3% to 1% (3,000 p.p.m. to 10,000 p.p.m.) of basic compounds calculated as ammonia.

The relatively dry acetonitrile containing the basic compound impurity was treated by adding 1,800 pounds of boric anhydride to 9,000 gallons of the crude. The mixture was constantly stirred and brought to reflux temperature (approximately 82° C.) during a period of about 4 hours. Following this 8,000 gallons of the refined acetonitrile was flashed away from the solids and the distillate, upon being subjected to analysis, was found to contain less than 6 p.p.m. of basic compounds calculated as ammonia.

The hereinabove set forth examples clearly demonstrate the use of a compound, falling within the definition hereinbefore set forth as pertains to decontaminating agents, to remove basic compounds from organic compounds such as those which are nitrogen-containing, water-soluble compounds, the basic compound impurity content being reduced from hundreds and even thousands of parts per million to less than 15 parts per million and in some instances to less than 10 parts per million.

We claim as our invention:

1. A process for the removal of at least one nitrogen-containing basic compound selected from the group consisting of ammonia, pyridine and pyridine bases from an organic compound selected from the group consisting of acetonitrile and propionitrile, said organic compound containing not more than about 15% by weight of water which comprises treating said organic compound at a temperature of from about 50° C. to about 150° C. with from about 2% to about 5% by weight of an inorganic acidic compound selected from the group consisting of boric acid, boric anhydride, phosphoric acid, phosphorous trioxide, phosphorous tetraoxide, phosphorous pentoxide, arsenious acid and stannic acid, and recovering the resultant purified organic compound.

2. The process of claim 1 further characterized in that said inorganic acidic compound is boric anhydride.

3. A process for the removal of at least one nitrogen-containing basic compound selected from the group consisting of ammonia, pyridine and pyridine bases from acetonitrile containing not more than about 15% by weight of water, which comprises treating said acetonitrile at a temperature of from about 50° C. to about 150° C. with from about 2% to about 5% by weight of boric anhydride, and recovering the purified acetonitrile.

4. A process for the removal of at least one nitrogen-containing basic compound selected from the group consisting of ammonia, pyridine and pyridine bases from acetonitrile containing not more than about 15% by weight of water, which comprises treating said acetonitrile at a temperature of from about 50° C. to about 150° C. with from about 2% to about 5% by weight of phosphorous pentoxide, and recovering the purified acetonitrile.

5. A process for the removal of at least one nitrogen-containing basic compound selected from the group consisting of ammonia, pyridine and pyridine bases from acetonitrile containing not more than about 15% by weight of water, which comprises treating said acetonitrile at a temperature of from about 50° C. to about 150° C. with from about 2% to about 5% by weight of boric acid, and recovering the purified acetonitrile.

No references cited.

CHARLES B. PARKER, *Primary Examiner.*